(12) United States Patent
Dubay

(10) Patent No.: US 8,424,587 B1
(45) Date of Patent: Apr. 23, 2013

(54) VACUUM/VENT BLOCK HAVING NON-UNIFORM PURGE PASSAGE

(76) Inventor: Richard L. Dubay, Coon Rapids, MN (US)

( * ) Notice: Subject to any disclaimer, the term of this patent is extended or adjusted under 35 U.S.C. 154(b) by 0 days.

(21) Appl. No.: 13/488,906

(22) Filed: Jun. 5, 2012

(51) Int. Cl.
 *B22D 17/10* (2006.01)
 *B29C 45/34* (2006.01)
(52) U.S. Cl.
 USPC .......................................... 164/305; 164/410
(58) Field of Classification Search ............... 164/305, 164/410; 249/141; 425/812
 See application file for complete search history.

(56) References Cited

U.S. PATENT DOCUMENTS

| | | |
|---|---|---|
| 2,890,488 A | 6/1959 | Gemberling |
| 3,349,833 A | 10/1967 | Hodler |
| 3,892,508 A | 7/1975 | Hodler |
| 3,991,971 A | 11/1976 | Drake |
| 4,027,726 A | 6/1977 | Hodler |
| 4,153,231 A | 5/1979 | Hayakawa et al. |
| 4,352,388 A | 10/1982 | Perrella |
| 4,359,443 A | 11/1982 | Michaels |
| 4,380,261 A | 4/1983 | Suzuki et al. |
| 4,828,479 A | 5/1989 | Pleasant |
| 4,986,338 A | 1/1991 | Yamauchi et al. |
| 5,012,568 A | 5/1991 | DiSimone et al. |
| 5,263,532 A | 11/1993 | Kawaguchi et al. |
| 5,350,289 A | 9/1994 | Martin |
| 5,360,049 A | 11/1994 | Rowe |
| 5,533,564 A | 7/1996 | Alberola et al. |
| 5,562,150 A | 10/1996 | Shimmell |
| 5,690,159 A | 11/1997 | Mizukusa |
| 5,913,355 A | 6/1999 | Muramatsu |
| 5,913,356 A | 6/1999 | Muramatsu |
| 6,116,891 A | 9/2000 | Starkey |
| 6,425,433 B1 * | 7/2002 | Hayes .......................... 164/305 |
| 6,431,254 B2 | 8/2002 | Dittrich |
| 6,443,723 B1 | 9/2002 | Buttigieg |

(Continued)

FOREIGN PATENT DOCUMENTS

JP 2002331528 A * 11/2002

OTHER PUBLICATIONS

Web site www.ngkmetals.com/chillcust.html, printed Jan. 16, 2004. (1 page).

(Continued)

*Primary Examiner* — Kevin P Kerns
*Assistant Examiner* — Kevin E Yoon
(74) *Attorney, Agent, or Firm* — Kinney & Lange, P.A.

(57) ABSTRACT

A vacuum/vent passageway for use in injection molding and die casting systems comprises a first-side and a second-side. The first-side comprises a first corrugated cooling face having a series of longitudinally spaced channels, wherein channels of the series of longitudinally spaced channels have non-uniform longitudinal cross-sectional trough shapes across the series of longitudinally spaced channels. The second-side comprises a second corrugated cooling face having a series of longitudinally spaced ribs, wherein ribs of the series of longitudinally spaced ribs have non-uniform longitudinal cross-sectional tip shapes across the series of longitudinally spaced ribs.

19 Claims, 7 Drawing Sheets

U.S. PATENT DOCUMENTS

| | | |
|---|---|---|
| 6,591,893 B1 | 7/2003 | Ratte et al. |
| 6,634,411 B2 | 10/2003 | Hirano et al. |
| 6,634,412 B1 | 10/2003 | Murray et al. |
| 6,637,498 B1 | 10/2003 | Macheske et al. |
| 7,111,663 B2 | 9/2006 | Murray et al. |
| 7,134,637 B2 | 11/2006 | Dubay |
| 7,631,851 B2 | 12/2009 | Dubay |
| 7,770,627 B2 | 8/2010 | Wang et al. |
| 2002/0100860 A1 | 8/2002 | Wieder |
| 2002/0127292 A1 | 9/2002 | Gallinotti et al. |
| 2004/0109909 A1 | 6/2004 | Dubay |

OTHER PUBLICATIONS

Web site www.ngkmetals.com/chilladvn.html, printed Jan. 16, 2004. (1 page).
Web site www.ngkmetals.com/chillvent.html, printed Jan. 16, 2004. (2 pages).
CASTvac™ product brochure, (5 pages).

* cited by examiner

VACUUM/VENT BLOCK HAVING NON-UNIFORM PURGE PASSAGE

BACKGROUND

The present invention relates generally to injection molding and die casting systems. In particular, the present invention relates to vacuum blocks and vent blocks used with injection molding and die casting systems.

Injection molding and die casting processes typically incorporate stationary and movable mold halves, which open and close along a parting line to define a cavity where the molding or casting manufacturing material is injected. Stationary mold halves, also known as fixed-die halves, fixed holder blocks, or cover blocks, are mounted to stationary platens. In contrast, movable mold halves, also known as movable-die halves, movable holder blocks, or ejector halves, are capable of moving relative to the stationary mold half for opening and closing the cavity. Movable mold halves are mounted to ejector platens, which are generally connected to hydraulic actuators for providing the movement required for ejecting the manufactured part.

Vacuum assistance in injection molding and die casting processes has been utilized to varying degrees for optimizing product quality. The general intent of the vacuum is to improve the production of injection molding and die casting by removing gases from within the molding and casting cavities. These improvements include higher surface quality, reduced level of porosity, and greater mechanical characteristics such as strength. Vacuum assistance generally requires the use of a vacuum pump, a vacuum line connecting the pump to the molding or casting cavity, and a means for preventing injected material from overflowing into the vacuum system. One approach for preventing the flow of the injected material is with an automated or manual valve located along the vacuum line. The purpose of the valve is to stop the flows of the vacuum and the injected material before the material enters the vacuum system.

An alternative approach for preventing overflow of the injected material is with gas purging blocks, such as a vacuum block or a vent block. Vacuum blocks typically comprise block-halves that are connected to the stationary and movable mold halves. The vacuum block simultaneously provides a gas purge passage for allowing the vacuum to remove the gases, and allows the excess injected material to solidify during the drawing of the vacuum. The solidified material functions as a stopper, preventing further manufacturing material from flowing out of the vacuum block and into the vacuum system. As such, vacuum blocks preclude the need for mechanical valves.

Similarly, vent blocks allow gases to be purged from the cavity of a molding or casting system by the force of the injected material flowing into the cavity. If the injected material is not stopped, it will continue to overflow out of the vent block with the purged gas. The vent block allows the injected material to solidify within the gas purge passage during the injection process, effectively stopping-up the gas path to permit the injected material to fully fill the cavity. As with vacuum blocks, the solidified material must be ejected from the vent block along with the new product being ejected from the mold or die cavity. Typically, with both vacuum blocks and vent blocks, the overflow material that solidifies in the blocks is cut from the molded products and recycled back into the raw materials for further use after ejection.

Vacuum and vent blocks typically utilize mating corrugated faces to form a gas purge passage having a uniform cross-sectional area. Uniform gas purge passages extend generally straight across the block-halves in a transverse direction, and extend longitudinally across the block-halves over a uniform corrugation pattern. The corrugated faces provide a high surface area over which heat is drawn away from the overflowing material. However, the circuitous path formed by the corrugated faces also increases the surface area over which the solidified material bonds to the block halves, thereby making parting of the mold halves difficult. There is, therefore, a continuing need to improve the heat transfer properties of corrugated faces in vacuum and vent blocks, while also permitting the solidified material to be easily removed.

SUMMARY

The present invention is directed to a vacuum/vent passageway for use in injection molding and die casting systems. The vacuum/vent passageway comprises a first-side and a second-side. The first-side comprises a first corrugated cooling face having a series of longitudinally spaced channels, wherein channels of the series of longitudinally spaced channels have non-uniform longitudinal cross-sectional trough shapes across the series of longitudinally spaced channels. The second-side comprises a second corrugated cooling face having a series of longitudinally spaced ribs, wherein ribs of the series of longitudinally spaced ribs have non-uniform longitudinal cross-sectional tip shapes across the series of longitudinally spaced ribs.

DETAILED DESCRIPTION

Figure 1:
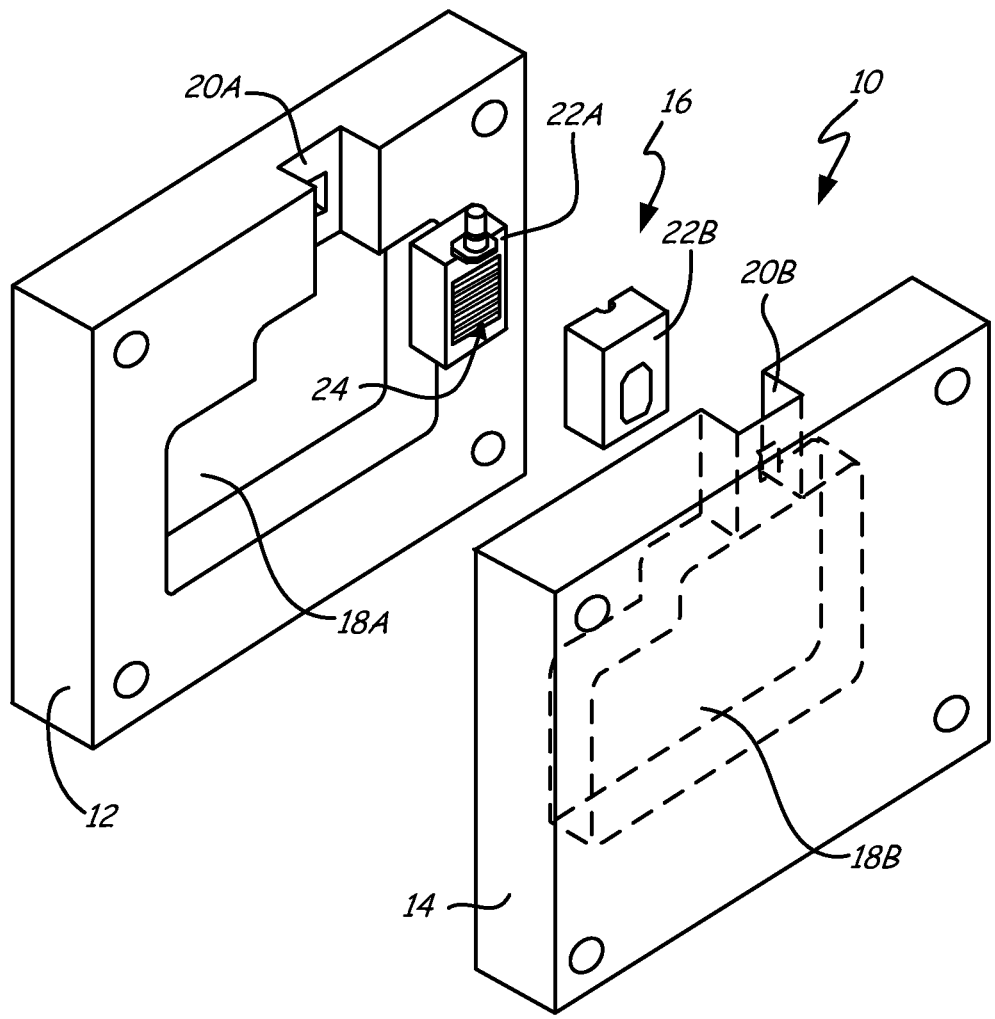
FIG. 1 is an exploded view of an injection molding or die casting system showing a vacuum/vent block of the present invention.

FIG. 1 is an exploded view of injection molding or die casting system 10. Injection molding or die casting system 10 includes stationary mold half 12, movable mold half 14 and vacuum/vent block 16 having a non-uniform gas purge passage of the present invention. For simplification, additional components of molding or casting system 10, such as the platens, the ejector pin, the vacuum system, and the injection mechanism, are not illustrated. Stationary mold half 12 includes mold cavity 18A and vent block pocket 20A, and movable mold half 14 includes mold cavity 18B and block pocket 20B. Movable mold half 14 mates with a stationary mold half 12 along a parting line such that mold cavity 18B aligns with mold cavity 18A to form a die or mold cavity. As such, manufacturing material, such as molten metal or plastic, can be introduced into the cavity to produce an article matching the shape of cavities 18A and 18B. Manufacturing material is injected into cavities 18A and 18B through injection mechanisms (not illustrated) positioned at various locations around mold halves 12 and 14. As manufacturing material is injected into cavities 18A and 18B, gas is purged from cavities 18A and 18B through vacuum/vent block 16. Vacuum/vent block 16 includes passageway 24, which includes undulations having different shapes so as to provide hybrid performance characteristics.

Vacuum/vent block 16 includes stationary-side gas purging block 22A and movable-side gas purging block 22B, which are respectively held in block pockets 20A and 20B. When stationary mold half 12 mates with movable mold half 14, stationary-side block 22A aligns with movable-side block 22B to assemble vacuum/vent block 16. Stationary side block 22A is mounted directly to mold half 12 at pocket 20A. Similarly, movable side block 22B is mounted directly to mold half 14 at pocket 22B such that the back of movable side block 22B is flush with the wall of cavity 18B. Alternatively, gas purging blocks 22A and 22B may be secured to mold halves 12 and 14 through cavity inserts (not shown). Cavity inserts are frames supported within cavities 18A and 18B, as is known in the art, for enhancing the shapes and designs of the molds or die casts. In such a case, stationary side block 22A and movable side block 22B are inserted into pockets 20A and 20B, and then mounted to the cavity inserts.

When a molding or casting process begins, mold halves 12 and 14 converge together to create a complete cavity from cavities 18A and 18B for manufacturing an article or part. This also allows stationary side block 22A and movable side block 22B to close together to function as vacuum/vent block 16 such that manufacturing material can be freely injected into cavities 18A and 18B. In order to alleviate porosity problems in the manufactured article, as well as to enhance other properties of the manufactured article, gas contained in cavities 18A and 18B is allowed to escape through vacuum/vent block 16. Vacuum/vent block 16 is functional as either a vent block or a vacuum block.

When vacuum/vent block 16 functions as a vacuum block, a vacuum source (not shown) is connected to block 16 such that a vacuum can be simultaneously pulled through vacuum/vent block 16 to evacuate gases from cavities 18A and 18B. Vacuum/vent block 16 includes passageway 24 that permits gas leakage, but prevents manufacturing material from entering the vacuum source or leaking outside of mold halves 12 and 14. Manufacturing material is sucked into vacuum/vent block 16 by the vacuum source as the gases are expunged from cavities 18A and 18B. The sucked-out material solidifies as it travels through passageway 24, plugging up vacuum/vent block 16, allowing the manufacturing material to solidify within passageway 24 to cease flow of additional material into vacuum/vent block 16. As such, the manufacturing material is permitted to fill up cavities 18A and 18B and to solidify in a reduced-gas environment thereby, among other things, reducing the porosity of the solidified article.

Vacuum/vent block 16 also functions as a simple vent block wherein gas is allowed to exit through block 16 through a vent valve (not shown). In lieu of pulling a vacuum through block 16, the gases are purged from cavities 18A and 18B by the flow of the injected material into cavities 18A and 18B. Excess manufacturing material continues to flow into vacuum/vent block 16 as it is injected into cavities 18A and 18B. The excess material is, however, prevented from exiting system 10 through block 16. The excess material solidifies as it travels through passageway 24 of block 16 thereby plugging up the vacuum/vent block 16 after the gases have been pushed out by the manufacturing material, such as in the case of a vacuum block.

The ability of vacuum/vent block 16 to cool excess or overflow manufacturing material flowing through it depends on its ability to cool the manufacturing material between the inlet and outlet of passageway 24. To enhance heat transfer between the material and block 16, the surfaces of channel 24 are corrugated to increase its surface area and volume. In the present invention, the shape of the corrugations on each face of passageway 24 is varied to additionally permit easy removal of solidified purged material. Specifically, passageway 24 transitions from arcuate corrugations near the inlet to rectangular corrugations near the outlet.

Figure 2:
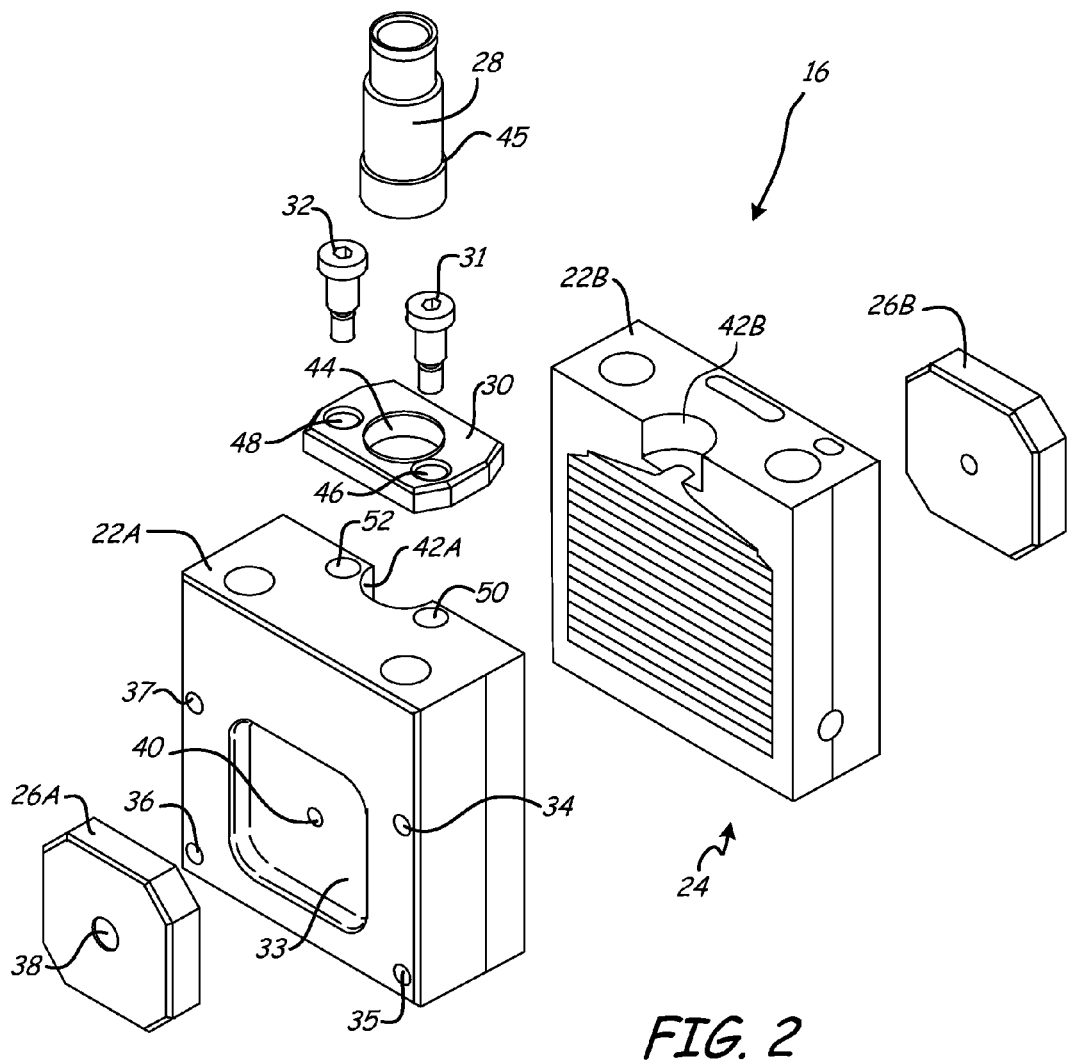
FIG. 2 is an exploded view of the vacuum/vent block of FIG. 1 showing block-halves of the present invention that form a non-uniform gas purge passage.

FIG. 2 shows an exploded view of vacuum/vent block 16 of the present invention. Vacuum/vent block 16 includes stationary-side block 22A, movable-side block 22B and passageway 24. Stationary-side block 22A includes stationary-side key 26A, vacuum line coupling 28, collar 30 and fasteners 31 and 32, while movable-side block 22B includes movable-side key 26B. Stationary-side key 26A and movable-side key 26B are used to secure stationary-side block 22A and movable-side block 22B to stationary die half 12 and movable die half 14, respectively. For example, stationary-side block 22A includes key slot 33 that squarely receives key 26A. Key 26A also fits squarely into a key slot on stationary mold half 12 (shown in FIG. 1) such that stationary-side block 22A mates squarely to mold half 12. A threaded fastener inserted through stationary mold half 12 is inserted through bore 38 of stationary-side key 26A and into bore 40 of stationary-side block 22A. Movable-side key 26B also fits into keys within movable-side block 22B and movable die half 14 such that movable-side block 22B mounts squarely onto movable die half 14. Additionally, vacuum/vent block 16 includes other means for mounting each block half. For example, stationary-side block 22A includes mounting bores 34, 35, 36 and 37 which can be used to mount stationary-side block 22A directly to stationary mold half 12.

Vacuum line coupling 28 is secured to stationary-side block 22A using collar 30 and fasteners 31 and 32. Vacuum line coupling 28 is inserted into a vacuum line coupling seat comprised of seat 42A and 42B located on stationary-side block 22A and movable-side block 22B, respectively. Bore 44 of collar 30 is seated around coupling 28 such that it rests on lip 45 of coupling 28 and the top surfaces of blocks 22A and 22B. Fasteners 31 and 32 are subsequently inserted through bores 46 and 48 of collar 30 and into bores 50 and 52 of stationary-side block 22A to secure coupling 22B to stationary-side block 22A.

Vacuum/vent block 16 includes passageway 24, which provides a channel between cavities 18A and 18B and vacuum line coupling 28. Passageway 24 is formed between mating corrugated faces of blocks 22A and 22B, respectively. The mating corrugated faces include arcuate corrugations to facilitate separation of blocks 22A and 22B away from solidified material, and rectilinear corrugations to inhibit migration of molten material out of passageway 24 while still maintaining high surface area.

Figure 3A:
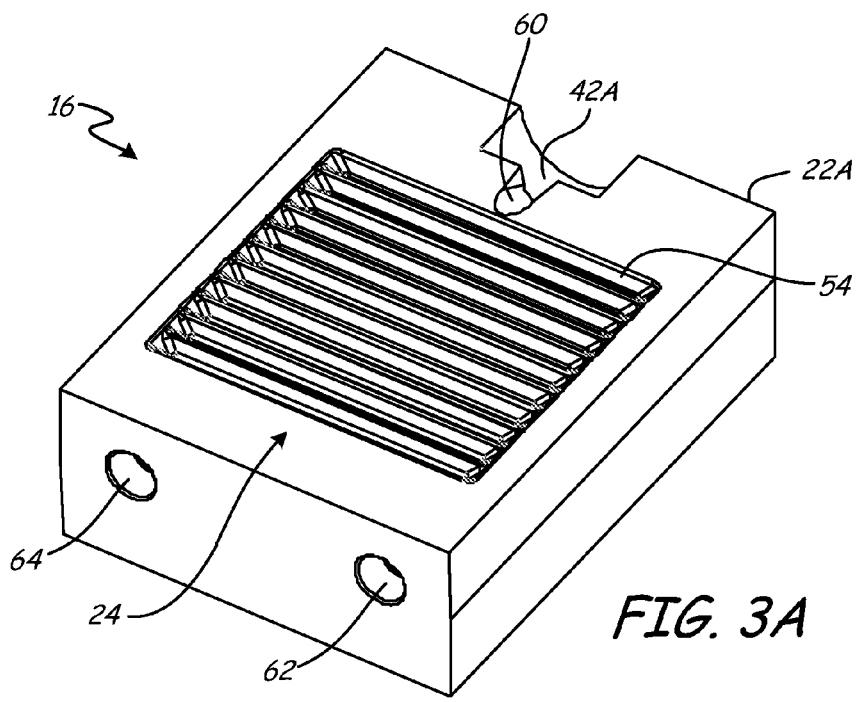
FIG. 3A is a perspective view of a stationary-side purging block-half of the vacuum/vent block of FIG. 2 showing a non-uniform corrugated face with recessed channels.
Figure 3B:
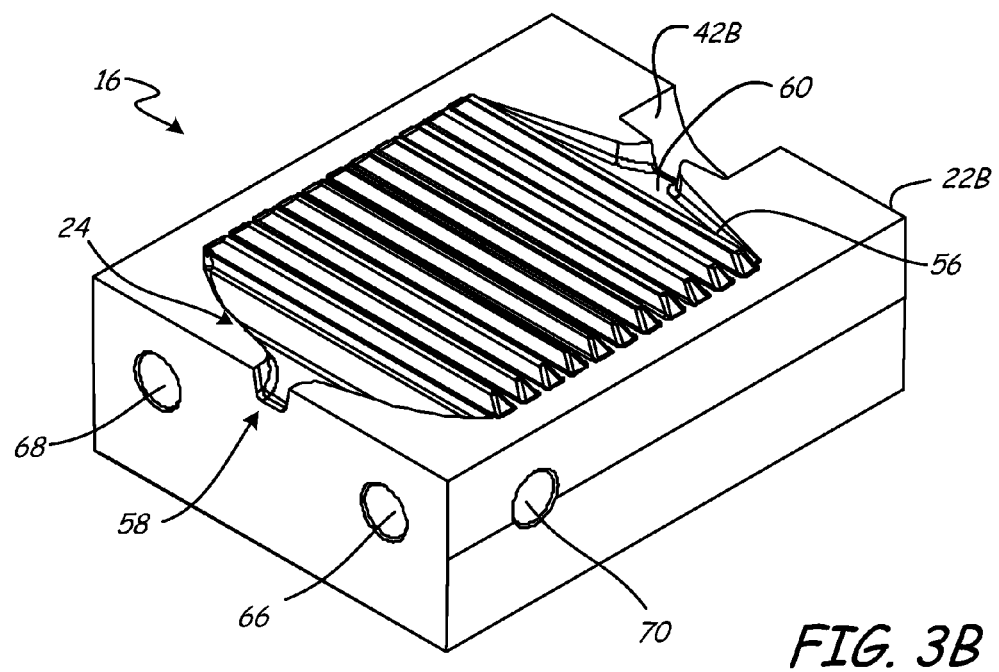
FIG. 3B is a perspective view of a movable-side purging block-half of the vacuum/vent block of FIG. 2 showing a non-uniform corrugate face with raised ribs.

FIGS. 3A and 3B show passageway 24 of vacuum/vent block 16. FIG. 3A shows stationary-side block 22A having channeled face 54, and FIG. 3B shows movable-side block 22B having ribbed face 56. Channeled face 54 and ribbed face 56 fit together to form passageway 24. Gas is pushed into passageway 24 at inlet 58 from within cavities 18A and 18B (FIG. 1) as manufacturing material enters stationary mold 12 and movable mold 14. The manufacturing material continues to enter passageway 24, pushing the gas out exit 60. The manufacturing material solidifies within passageway 24 to prevent excess manufacturing material from exiting system 10 through vacuum/vent block 16.

As indicated above, the ability of vacuum/vent block 16 to purge gases without permitting manufacturing material to escape from system 10 depends on its ability to cool manufacturing material running through passageway 24. As molten manufacturing material flows through passageway 24, stationary-side block 22A and movable-side block 22B extract heat from the manufacturing material. Vacuum/vent block 16 accumulates heat from the hot manufacturing material and is thereby limited in its ability to extract additional heat by its ability to dissipate. In order to assist in removing heat from the manufacturing material and passageway 24, and hence vacuum/vent block 16, stationary-side block 22A and movable-side block 22B are provided with cooling fluid channels 62, 64, 66, 68 and 70. A cooling fluid, such as water, is circulated through cooling channels 62-70 to assist in removing heat from vacuum/vent block 16. Cooling channels 62-70 are, however, limited in their ability to pull heat away from passageway 24. The cooling fluid can only transfer as much heat as can be imparted into block halves 22A and 22B by the manufacturing material, which is limited by the amount of surface area of passageway 24 available to contact the manufacturing material. Therefore, vacuum/vent block 16 is provided with channeled face 54 and ribbed face 56 to increase the surface area of passageway 24.

Channeled face 54 and ribbed face 56 include complimentary ribs and grooves that form a corrugated passageway or channel for drawing gas and manufacturing material from mold cavities 18A and 18B. The corrugation of passageway 24 increases the surface area and volume of passageway 24 in a first, longitudinal direction across passageway 24. The ribs and grooves of passageway 24 extend over a width in a second, transverse direction to further increase the surface area of passageway 24. The corrugation of channeled face 54 and ribbed face 56 increases the volume of passageway 24 such that more manufacturing material can be drawn from mold cavities 18A and 18B. Thus, more air can also be removed from mold cavities 18A and 18B. In the present invention, channeled face 54 and ribbed face 56 allow cooled and solidified manufacturing material to be easily removed from passageway 24.

Figure 4A:
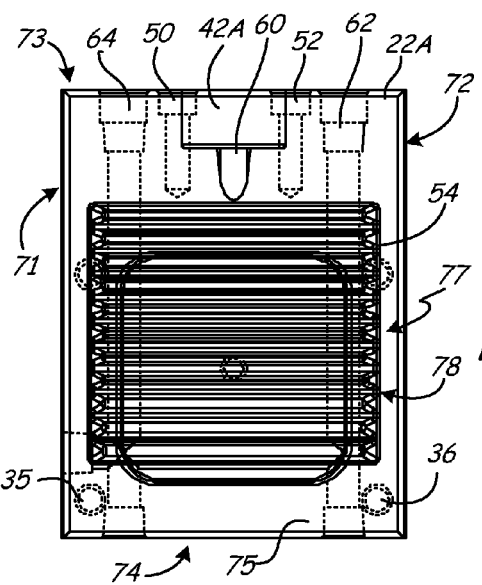
FIGS. 4A, 4B and 4C are front, side and top views of the stationary-side gas purging block-half of FIG. 3A, respectively.
Figure 4B:
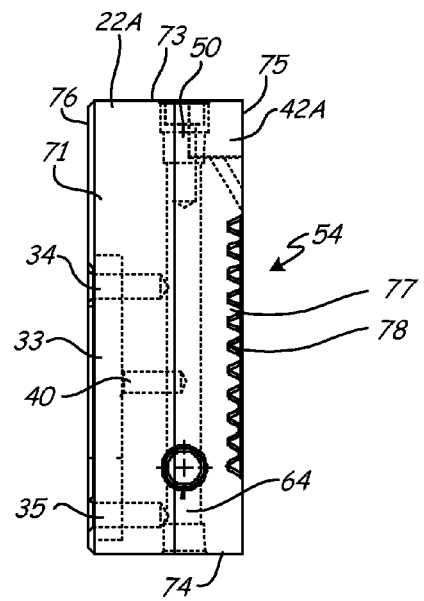
Figure 4C:
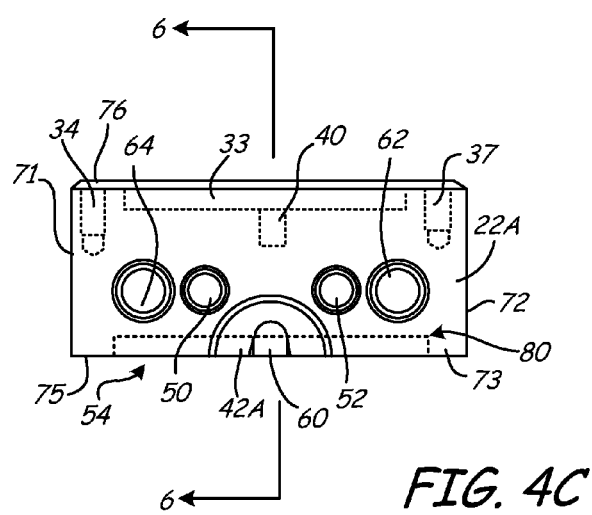

FIG. 4A shows a front view of stationary-side block 22A of FIG. 3B. FIG. 4B shows a side view of stationary-side block 22A. FIG. 4C shows a top view of stationary-side block 22A. FIGS. 4A-4C are discussed concurrently. Stationary-side block 22A includes channeled face 54 that forms a portion of passageway 24. Stationary-side block 22A also includes key slot 33, fastener bores 34 through 37, bore 40, seat 42A, vacuum line coupling bores 50 and 52, cooling channel bores 62 and 64, first side 71, second side 72, top side 73, bottom side 74, front side 75 and back side 76.

Channeled face 54 forms half of passageway 24 through vacuum/vent block 16. Channeled face 54 includes a series of dividers 77 and channels 78 sequenced generally longitudinally from top side 73 to bottom side 74, which extend generally transversely across face 54 from first side 71 to second side 72 along line 80 in a generally straight or flat manner. In other embodiments, line 80 may be contoured, such as described in U.S. Pat. No. 7,631,851 to Dubay. Channels 78 extend inward into front side 75 of stationary-side block 22A toward rear side 76, while dividers 77 extend toward, but not all the way to, front side 75 in order to permit flow of material and gas.

Gas and manufacturing material enter channeled face 54 through inlet 58 of movable-side block 22B (FIG. 3B), flow across dividers 77 and channels 78, and leave vacuum/vent block 16 at exit 60. Cooling fluid is circulated through cooling channels 62 and 64 to remove heat from channeled face 54, while face 54 extracts heat from the manufacturing material flowing through passageway 24 to increase the heat extraction capabilities of channeled face 54. Dividers 77 and channels 78 increase the longitudinal surface area of passageway 24. As discussed in more detail later with respect to FIGS. 6 and 7, channels 78 have rounded troughs near bottom side 74 and rectilinear troughs near top side 73. Dividers 77 and channels 78 are configured to mesh with ribs and grooves on movable-side half 22B.

Figure 5A:
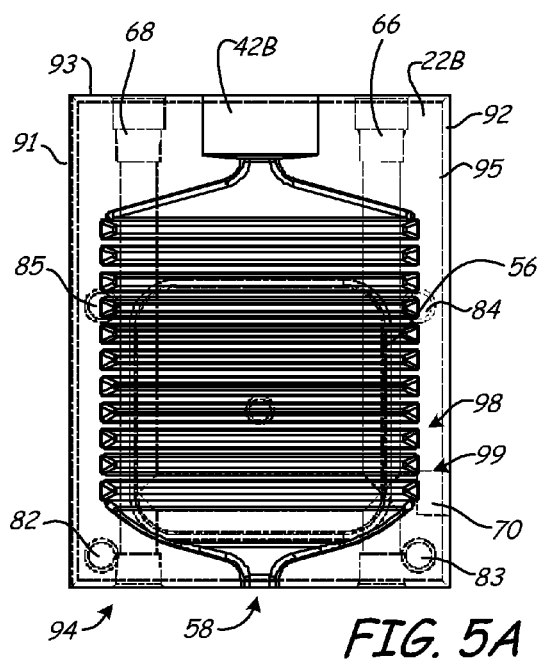
FIGS. 5A, 5B and 5C are front, side and top views of the movable-side gas purging block-half of FIG. 3B, respectively.
Figure 5B:
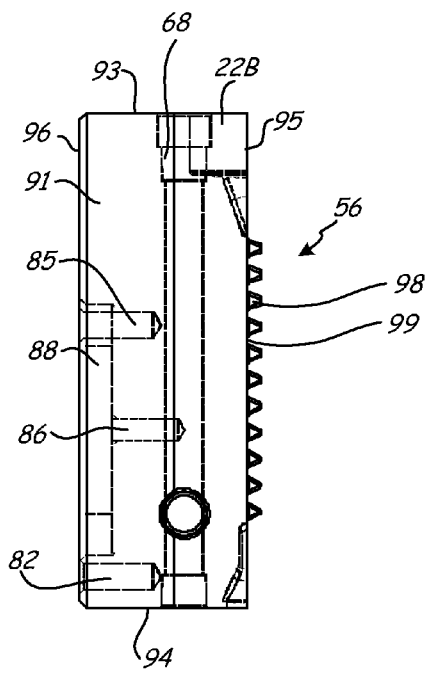
Figure 5C:
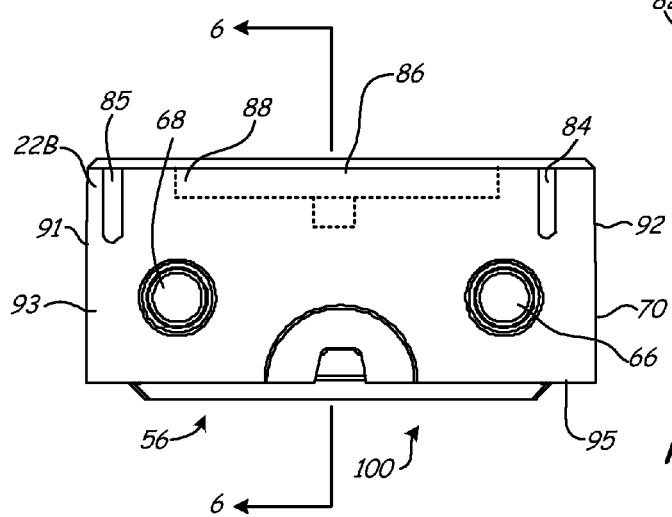

FIG. 5A shows a front view of movable-side block 22B of FIG. 3B. FIG. 5B shows a side view of movable-side block 22B. FIG. 5C shows a top view of movable-side block 22B. FIGS. 5A-5C are discussed concurrently. Movable-side block 22B includes ribbed face 56 that forms a portion of passageway 24. Movable-side block 22B also includes key vacuum line seat 42B, cooling channels 66, 68 and 70, fastener bores 82, 83, 84 and 85, bore 86, key slot 88, first side 91, second side 92, top side 93, bottom side 94, front side 95 and back side 96. Fastener bores 82, 83, 84 and 85, bore 86 and key slot 88 serve to secure movable-side block 22B to movable mold half 14 in much the same manner as key slot 33, fastener bores 34 through 37 and bore 40 serve to secure stationary-side block 22A to stationary mold half 12.

Ribbed face 56 forms half of passageway 24 through vacuum/vent block 16. Ribbed face 56 includes a series of ribs 98 and grooves 99 sequenced generally longitudinally from top side 93 to bottom side 94, which extend generally transversely across face 56 from first side 91 to second side 92 along line 100 in a generally straight or flat manner. In other embodiments, line 100 may be contoured, such as described in U.S. Pat. No. 7,631,851 to Dubay. Ribs 98 extend outward from front side 95 of movable-side block 22B away from back side 96, while grooves 99 extend toward front side 95 in order to permit flow of material and gas. Grooves 99 may extend all the way to front side 95 or may be recessed into front side 95.

Gas and manufacturing material enter ribbed face 56 through inlet 58, flow across ribs 98 and grooves 99, and leave vacuum/vent block 16 at exit 60. Cooling fluid is circulated through cooling channels 66 and 68 to remove heat from convex face 56, while face 56 extracts heat from the manufacturing material flowing through passageway 24. Ribs 98 and grooves 99 increase the longitudinal surface area of passageway 24 to increase the heat extraction capabilities of ribbed face 56. As discussed in more detail later with respect to FIGS. 6 and 7, ribs 98 have rounded tips near bottom side 94 and rectilinear tips near top side 93. Ribs 98 and grooves 99 of movable-side block 22B mesh with dividers 77 and channels 78 of stationary-side block 22A to form gas purge passageway 24 (FIGS. 3A & 3B).

Figure 6:
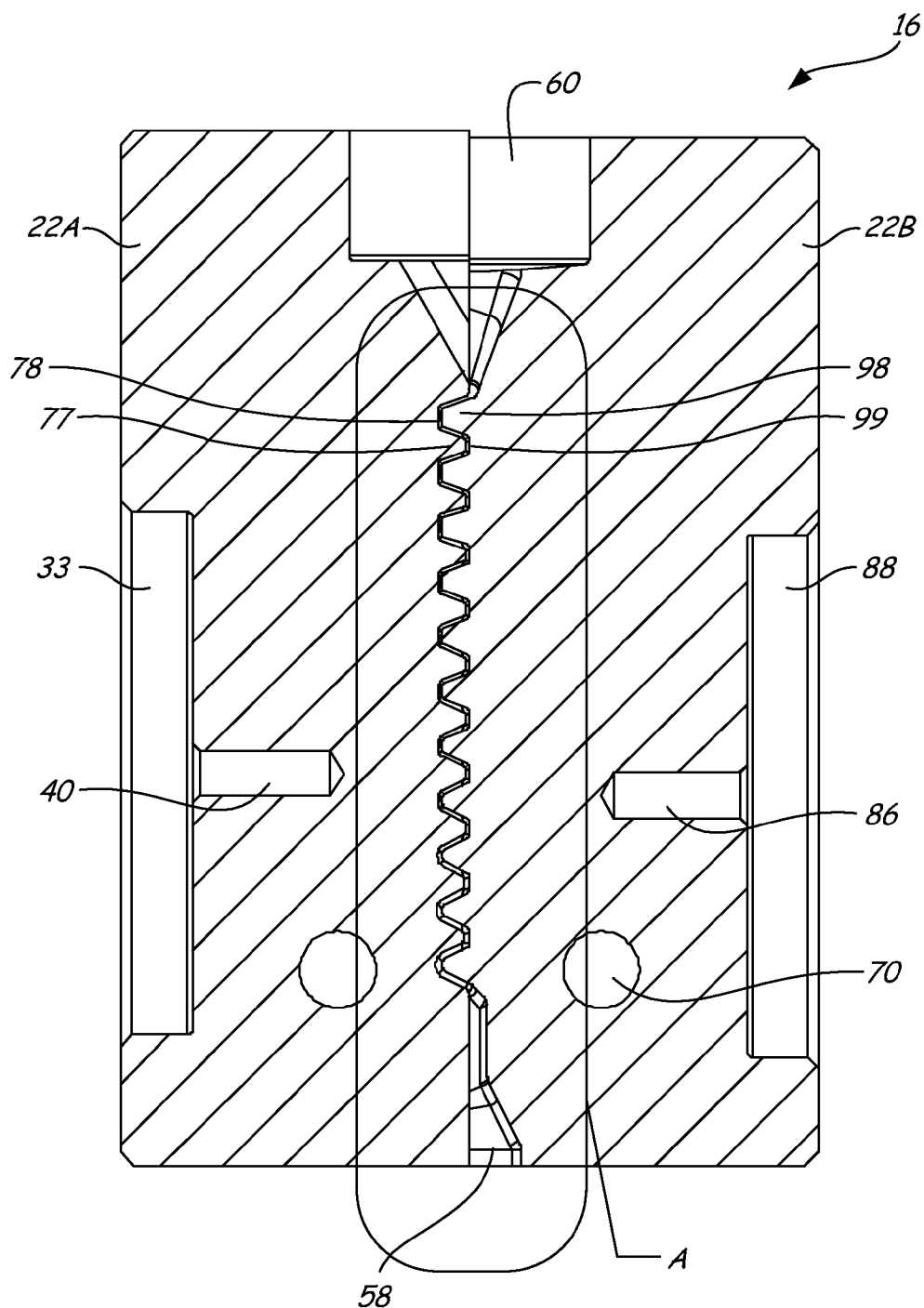
FIG. 6 is a cross-section of a stationary-side gas purging block-half assembled with a movable-side gas purging block-half in which the non-uniform corrugated faces come together to form a gas purge passage with a varied cross-sectional area.

FIG. 6 shows cross-section 6-6 of FIG. 5C of movable-side block 22B, and cross-section 6-6 from FIG. 4C of stationary-side block 22A. FIG. 6 shows the merging of channeled face 54 and ribbed face 56, with meshing of channels 78 and dividers 77 with ribs 98 and grooves 99, respectively, to form passageway 24. Dividers 77, channels 78, ribs 98 and grooves 99 increase the longitudinal length of passageway 24 to accept increased volumes of manufacturing material and gases purged from cavities 18A and 18B (FIG. 1), and increase the distance the manufacturing material must travel before reaching exit 60. Specifically, dividers 77 are positioned between grooves 99 and ribs 98 are positioned between channels 78 to produce gas purge passageway 24. The transverse surface areas of channeled face 54 and ribbed face 56 extend from sides 71 and 91 to sides 72 and 92 (FIGS. 4A-5C), respectively. Dividers 77 and channels 78 form a series of longitudinally spaced channels between bottom side 74 and top side 73, while ribs 98 and grooves 99 form a series of longitudinally spaced ribs between bottom side 94 and top side 93, both of which increase the longitudinal area of passage 24.

Passageway 24 of the present invention has a varied or non-uniform cross-sectional area in the longitudinal direction to achieve multiple objectives during flow of molten manufacturing material and after the manufacturing material has solidified. For example, passageway 24 includes some corrugations that have rounded tips and troughs near inlet 58 to facilitate parting of movable-side block 22B from stationary-side block 22A.

Manufacturing material enters inlet 58, pushing gases from within cavities 18A and 18B into passageway 24. Dividers 77, channels 78, ribs 98 and grooves 99 are rounded near inlet 58 to permit molten material to readily enter passageway 24. Channels 78 are also deeper near inlet 58 (as compared to near outlet 60) to increase the height, or cross-sectional area, of passageway 24. Thus, near inlet 58 sharp edges and tight turns are eliminated in passageway 24, thereby facilitating easy parting of stationary-side block 22A and movable-side block 22B after the manufacturing material has solidified.

Manufacturing material continues to enter passageway 24 pushing the gases out of passageway 24 through exit 60. Channeled face 54 and ribbed face 56 are configured such that they draw heat away from the manufacturing material such that it will solidify before leaving vacuum/vent block 16 through exit 60, but after a large volume of gas is purged from cavities 18A and 18B. Passageway 24 disperses the manufacturing material into a thin sheet as it flows between channeled face 54 and ribbed face 56 so that heat is readily absorbed from the manufacturing material. Dividers 77, channels 78, ribs 98 and grooves 99 are rectilinear near outlet 60 to inhibit flow of molten material within passageway 24. The sharp edges provide a tortous path with tight turns that arrest the flow of molten material. Channels 78 are shallower near outlet 60 (as compared to near inlet 58) to decrease the height, or cross-sectional area, of passageway 24. Thus, near outlet 60 sharp edges and tight turns are introduced into passageway 24 to decrease flow of molten material and reduce the potential for molten material from exiting outlet 60.

Figure 7:
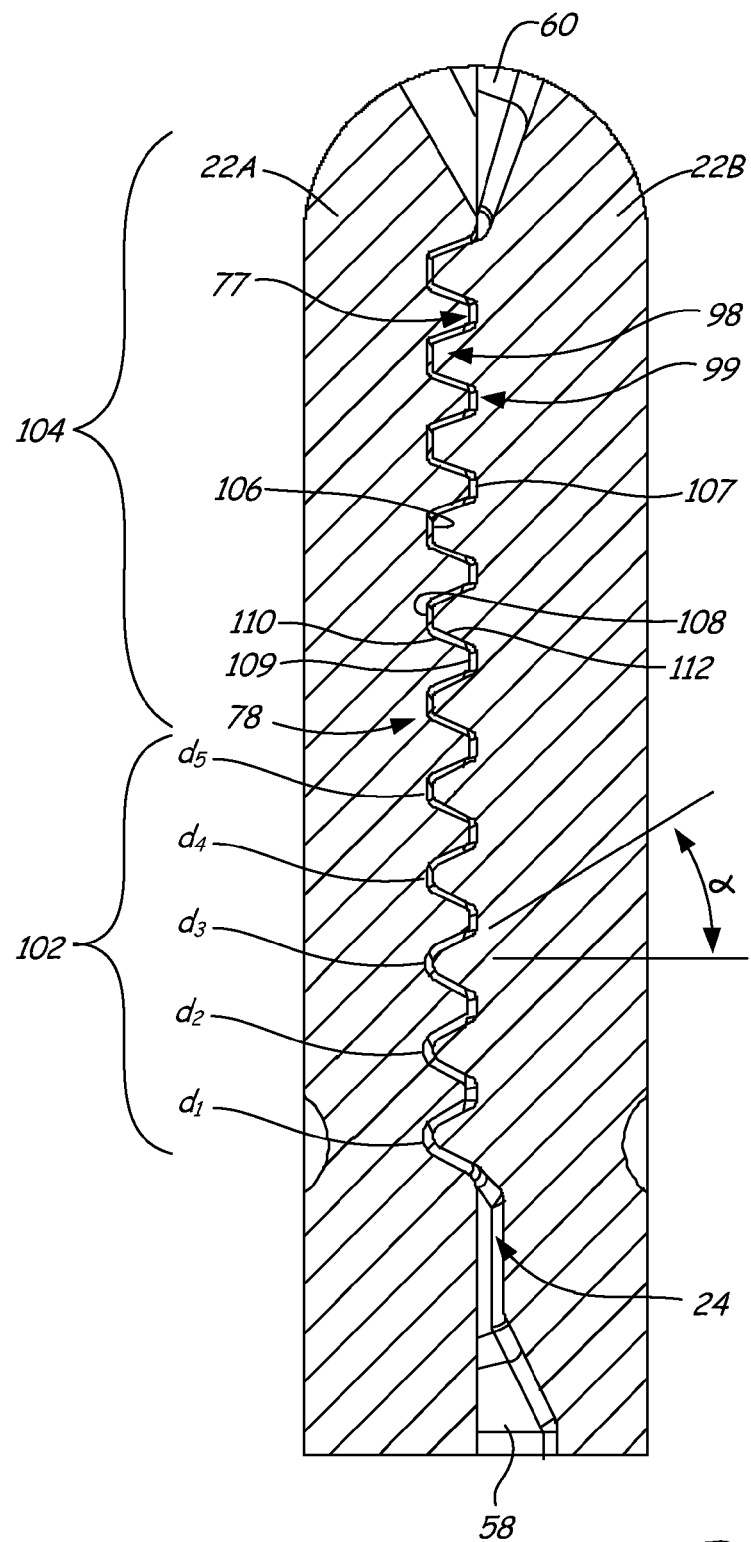
FIG. 7 shows a close-up view of the gas purge passage of FIG. 6 showing the varied cross-sectional area transitioning from rounded channels and ribs to rectangular channels and ribs.

FIG. 7 is a close-up view of callout A of FIG. 6 showing ribs 98 and groove 99 of movable-side block 22B meshing with channels 78 and dividers 77 of stationary-side block 22A to form passageway 24. As shown, passageway 24 is non-linear in the longitudinal direction, forming inlet region 102 and outlet region 104. Inlet region 102 is wider (with respect to FIG. 7) than outlet region 104. Further, inlet region 102 includes rounded and hybrid tips and troughs, while outlet region 104 includes rectilinear tips and troughs. Specifically, in the depicted embodiment, troughs 107 are uniform throughout block 22B. Tips 106 are equally tall throughout block 22B, but progress from arcuate to rectilinear shaped from inlet 58 to outlet 60. Tips 109 grow in height from inlet 58 to outlet 60, while transitioning from arcuate-shaped to rectilinear shaped. Troughs 108 shrink in depth from inlet 58 to outlet 60, while transitioning from arcuate-shaped to rectilinear-shaped. Other combinations of these features can be used in other embodiments to achieve a similar narrowing of passageway 24 from inlet region 102 to outlet region 104.

A line connecting each of tips 106 and a line connecting each of troughs 107 of ribs 98 are approximately parallel to the general orientation of passageway 24. However, lines connecting tips 109 of dividers 77 and troughs 108 of channels 78 vary along passageway 24 between inlet 58 and outlet 60. Specifically, the line connecting troughs 108 is generally parallel to passageway 24 within outlet region 104, but bends towards back side 76 (FIG. 6) in inlet region 102. Likewise, the line connecting tips 109 is generally parallel to passageway 24 within outlet region 104, but bends towards back side 76 (FIG. 6) in inlet region 102. The distances between channeled face 54 and ribbed face 56 are labeled as distances $d_1$-$d_5$. As such, distance $d_1$ is greater than distance $d_2$, distance $d_2$ is greater than distance $d_3$, distance $d_3$ is greater than distance $d_4$, and distance $d_4$ is greater than distance $d_5$. Distance $d_5$ is repeated throughout outlet region 104.

Manufacturing material must flow down into each channel 78 and back up each divider 77 as it traverses face 54 toward exit 60. Simultaneously, the manufacturing material is flowing up ribs 98 and then down grooves 99 as it traverses face 56. Thus, the residence time of the manufacturing material in passageway 24 is increased. Near inlet 58, troughs 108 of channels 78 are curved surfaces that smoothly join to sidewalls 110. Likewise, tips 106 of ribs 98 are curved surfaces that join smoothly to sidewalls 112 near inlet 58. In one embodiment, tips 106 and troughs 108 are sinusoidal near inlet 58. The curved surfaces facilitate flow of molten manufacturing material into passageway 24. Furthermore, upon solidification of the material, edges forming tight angles between adjacent surfaces are avoided to reduce friction between channeled face 54 and ribbed face 56 and the solidified material. This reduces the force required to separate the manufactured material from movable-side block 22B and stationary-side block 22A.

As the molten material continues toward outlet 60 at a reduced temperature, tips 106 and troughs 108 begin to flatten out. Channels 78 have curved surfaces, or corners, that join the flattened troughs to sidewalls 110. Likewise, ribs 98 have curved surfaces, or corners, that join the flattened tips to sidewalls 112. Further, channels 78 become shallower so that troughs 108 come closer to tips 106, thereby reducing the cross-sectional area of passageway 24. The width of the flattened tips and flattened troughs increases throughout inlet region 102 until outlet region 104 is reached.

Near outlet 60 within outlet region 104, channels 78 are rectilinear such that flat troughs 108 are joined to sidewalls 110 at an edge without any curved surfaces. Likewise, ribs 98 are rectilinear such that flat tips 106 are joined to sidewalls 112 sidewalls 112 at an edge without any curved surfaces near outlet 60. The edges provide tight turns or constrictions through which the molten material must flow to slow its progress through channel 24, thereby increasing residency time and heat transfer. Thus, the material will completely solidify before reaching outlet 60. This eliminates or reduces the risk of molten material from exiting vacuum/vent block 16.

The sidewalls of ribs 98 and channels 78 are generally oblique to the general longitudinal orientation of passageway 24. For example, ribs 98 extend outward from face 56 at angle $\alpha$. In one embodiment angle $\alpha$ is approximately thirty degrees from a line perpendicular to face 56 (or about one hundred twenty degrees from face 56). In other embodiments, angle $\alpha$ ranges from about fifteen to about forty five degrees. However, angle $\alpha$ can be any angle that permits face 56 and face 54 to engage and disengage without binding.

Vacuum/vent block 16, including dividers 77, channels 78, ribs 98 and grooves 99, can be made of any material suitable for either injection molding or die casting. Any high-wear material with good heat transfer characteristics (e.g. high thermal conductivity), such as copper, steel, premium AISI H-13 or S-7 heat-treated steel or equivalents, tool steels, beryllium or beryllium-free material may be used.

The relative sizes of stationary-side block 22A and movable-side block 22B shown in FIGS. 1-7 are exemplary only. Stationary-size block 22A and movable-side block 22B, can be made having various dimensions for use in smaller or larger die casting or injection molding operations. However, for each particular size of stationary-size block 22A and movable-side block 22B, passageway 24 utilizes rounded tips and troughs near inlet 58 to facilitate easy parting of blocks 22A and 22B after solidification of material. Additionally, passageway 24 narrows and/or uses rectilinear tips and troughs near outlet 60 to slow movement of molten material and accelerate solidification. The present invention provides a block that can be easily separated, while maintaining a high-volume capacity. The vacuum/vent block of the present invention can be made without increasing the overall dimensions of the block, thus permitting read integrated into existing casting and molding systems having standard vacuum/vent block pockets.

In yet other embodiments of the invention, mold halves 12 and 14 can be directly incorporated with passageway 24. For example, instead of including removable vacuum/vent blocks 22A and 22B in pockets 20A and 20B, respectively, channeled face 54 and ribbed face 56 can be provided on mating faces of mold halves 12 and 14 above cavities 18A and 18B. Such an embodiment would be simpler and include fewer parts, but would not provide interchangeability of vacuum/vent blocks with different characteristics in the same set of mold halves.

Although described with reference to stationary-side block 22A having dividers 77 and channels 78 and movable-side block 22B having ribs 98 and grooves 99, in other embodiments, the situation may be reversed. Further, while the invention has been described with reference to rounded tips and troughs, hybrid tips and troughs, and rectilinear tips and troughs, other combinations may be used. For example, only rounded and rectilinear tips and troughs may be used, or only rounded and hybrid tips and troughs may be used. Likewise, the tip and trough shapes can have various types of curvature or arcuate shape other than "rounded," e.g. having a simple radius of curvature. For example, the tips can be elliptical or parabolic in nature or can have a compound curvature or a continuously changing curvature. In yet other embodiments, the rounded tips and troughs may be near outlet 60, while the rectilinear tips and troughs may be near inlet 58. Additionally, rounded tips and troughs may be interspersed with rectilinear tips and troughs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas purging passageway for use with injection molding and die casting systems, the gas purging passageway comprising:
   a first-side comprising a first corrugated cooling face having a series of longitudinally spaced channels, wherein channels of the series of longitudinally spaced channels have non-uniform longitudinal cross-sectional trough shapes across the series of longitudinally spaced channels; and
   a second-side comprising a second corrugated cooling face having a series of longitudinally spaced ribs, wherein ribs of the series of longitudinally spaced ribs have non-uniform longitudinal cross-sectional tip shapes across the series of longitudinally spaced ribs, wherein: the non-uniform longitudinal cross-sectional trough shapes transition from arcuate trough shape to rectilinear trough shape across the series; and the non-uniform longitudinal cross-sectional tip shapes transition from arcuate shape to rectilinear tip shape.

2. The gas purging passageway of claim 1 wherein:
   the non-uniform longitudinal cross-sectional trough shapes include rounded troughs, rectilinear troughs, and flat troughs with round corners positioned between the rounded troughs and rectilinear troughs; and
   the non-uniform longitudinal cross-sectional tip shapes include rounded tips, rectilinear tips, and flat tips with rounded corners positioned between the rounded tips and the rectilinear tips.

3. The gas purging passageway of claim 1 wherein the series of longitudinally spaced channels and the series of longitudinally spaced ribs transition from sinusoidal shapes to trapezoidal shapes.

4. The gas purging passageway of claim 1 wherein the series of longitudinally spaced channels mesh with the series of longitudinally spaced ribs to form a gas purging and material cooling passageway having a varying longitudinal cross-sectional flow path area.

5. The gas purging passageway of claim 4 wherein the passageway comprises:
   a transition region where the cross-sectional flow path area is changing from greater to lesser; and
   a steady region where the cross-sectional flow path area is constant.

6. The gas purging passageway of claim 1 wherein the first corrugated cooling face and the second cooling face mesh to form a circuitous gas purging and material cooling passageway that increases a length of the passageway with respect to the longitudinal length of the gas purging block.

7. The gas purging passageway of claim 1 wherein:
   the series of longitudinally spaced channels and the series of longitudinally spaced ribs extend from an inlet at a bottom end of the passageway to an outlet at a top end of the passageway; and
   the ribs and grooves extend between a first side end and a second side end of the passageway.

8. The gas purging passageway of claim 1 wherein:
   the troughs are deeper at a first end of the passageway than at a second end of the passageway; and
   the tips are shorter at the first end than at the second end.

9. A gas purging block for use with injection molding and die casting systems, the gas purging block comprising:
   a stationary-side block comprising:
      a first stationary side;
      a second stationary side spaced from the first stationary side in a longitudinal direction;

a channeled heat exchanging surface extending between the first and second stationary sides;

a plurality of channels extending across the channeled heat exchanging surface in a transverse direction to increase longitudinal surface area of the channeled heat exchanging surface between the first and second stationary sides, the plurality of channels defining a first non-uniform lineation in the longitudinal direction; and an ejector-side block adapted to engage with the stationary-side block, comprising:

a first ejector side;

a second ejector side spaced from the first ejector side in the longitudinal direction;

a ribbed heat exchanging surface extending between the first and second ejector sides;

a plurality of ribs extending across the ribbed heat exchanging surface in the transverse direction to increase longitudinal surface area of the ribbed heat exchanging surface between the first and second ejector sides, the plurality of ribs defining a second non-uniform lineation in the longitudinal direction, wherein: the first non-uniform lineation transitions from arcuate troughs at the first stationary side to rectilinear troughs at the second stationary side; and the second non-uniform lineation transitions from arcuate tips at the first ejector side to rectilinear tips at the second ejector side.

10. The gas purging block of claim 6 wherein:

the arcuate troughs are deeper than the rectilinear troughs; and the arcuate tips are shorter than the rectilinear tips.

11. The gas purging block of claim 6 wherein:

the first non-uniform lineation transitions from sinusoidal at the first stationary side to trapezoidal at the second stationary side; and the second non-linear lineation transitions from sinusoidal at the first ejector side to trapezoidal at the second ejector side.

12. The gas purging block of claim 9 wherein the first non-uniform lineation meshes with the second non-uniform lineation to form a gas purging and material cooling passageway having a varying longitudinal cross-sectional flow path area.

13. The gas purging block of claim 12 wherein the passageway comprises:

a transition region where the cross-sectional flow path area is narrowing; and a steady region where the cross-sectional flow path area is constant.

14. A block-half for use with a vacuum/vent block in injection molding and die casting systems, the block-half comprising:

a first side surface;

a second side surface spaced transversely from the first side surface;

a top surface disposed between the first side surface and the second side surface;

a bottom surface spaced longitudinally from the top surface;

an exterior mounting surface bounded by the first and second side surfaces, the top surface and the bottom surface;

an interior cooling surface spaced from the exterior mounting surface; and a corrugated cooling passageway extending longitudinally along the interior cooling surface between the bottom surface and the top surface, the corrugated cooling passageway defining non-uniform undulations, wherein: the non-uniform undulations transition from arcuate troughs and tips near the bottom surface to rectilinear troughs and tips near the top surface.

15. The block-half of claim 14 wherein the non-uniform undulations transitions from a sinusoidal-like shape near the bottom surface to a trapezoidal-like shape near the top surface.

16. The block-half of claim 14 wherein the non-uniform undulations define half of a gas purging and material cooling passageway having an decreasing cross-sectional flow path area between the bottom surface and the top surface.

17. The block-half of claim 16 wherein the passageway comprises:

a transition region where the cross-sectional flow path area is narrowing; and a steady region where the cross-sectional flow path area is constant.

18. The block-half of claim 14 wherein the non-uniform undulations are deeper near the bottom surface than near the top surface.

19. The block-half of claim 14 and further comprising:

a pair of coolant fluid channels extending through the block-half between the top surface and bottom surface;

a material inlet in the bottom surface; and a material outlet in the top surface.

* * * * *